(12) United States Patent
Chen et al.

(10) Patent No.: US 8,534,776 B2
(45) Date of Patent: Sep. 17, 2013

(54) BEZEL ASSEMBLY FOR COMPUTER

(75) Inventors: Li-Ping Chen, New Taipei (TW); Chen-Lu Fan, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/364,427

(22) Filed: Feb. 2, 2012

(65) Prior Publication Data

US 2012/0326582 A1 Dec. 27, 2012

(30) Foreign Application Priority Data

Jun. 24, 2011 (TW) ................................ 100122143

(51) Int. Cl.
*A47B 81/00* (2006.01)
(52) U.S. Cl.
USPC ...................................................... 312/223.2
(58) Field of Classification Search
USPC ........... 312/223.2, 265.5, 265.6; 361/679.57, 361/679.58, 679.59, 679.6
See application file for complete search history.

(56) References Cited

U.S. PATENT DOCUMENTS

| | | | | |
|---|---|---|---|---|
| 5,220,712 A * | 6/1993 | Taki et al. | ........................ | 24/614 |
| 5,917,696 A * | 6/1999 | Peng | ........................ | 361/679.33 |
| 6,927,968 B2 * | 8/2005 | Pols Sandhu et al. | ... | 361/679.57 |
| 6,927,984 B2 * | 8/2005 | Chen | ........................ | 361/801 |
| 6,944,016 B2 * | 9/2005 | Chen et al. | ................ | 361/679.33 |
| 7,002,811 B2 * | 2/2006 | Jing et al. | ........................ | 361/801 |
| 7,377,602 B2 * | 5/2008 | Chen et al. | ................ | 312/223.2 |
| 7,499,275 B2 * | 3/2009 | Lai et al. | ........................ | 361/695 |
| 7,663,881 B2 * | 2/2010 | Kuo | ........................ | 361/692 |
| 7,724,514 B2 * | 5/2010 | Peng et al. | ................ | 361/679.49 |
| RE41,514 E * | 8/2010 | Behl et al. | ................ | 312/223.1 |
| 7,826,213 B2 * | 11/2010 | Peng et al. | ................ | 361/679.46 |
| 2007/0053143 A1 * | 3/2007 | Kang | ........................ | 361/678 |

* cited by examiner

*Primary Examiner* — Darnell Jayne
*Assistant Examiner* — Matthew Ing
(74) *Attorney, Agent, or Firm* — Altis Law Group, Inc.

(57) ABSTRACT

A bezel assembly includes a bezel, at least one base member secured to the bezel, and at least one engaging member slidably attached to the at least one base member. The at least one base member includes a side flange substantially perpendicular to the bezel. At least one opening is defined in the side flange. The at least one engaging member includes at least one engaging protrusion. The at least one engaging member is slidable between an original position, wherein the at least one engaging protrusion engages into the at least one opening and protrudes out from an exterior surface of the side flange, and a release position, wherein the at least one engaging protrusion is disengaged from the at least one opening and retracts to an inner side of the side flange.

20 Claims, 5 Drawing Sheets

BEZEL ASSEMBLY FOR COMPUTER

BACKGROUND

1. Technical Field

The present disclosure relates to a bezel assembly, and more particularly to a bezel assembly for a computer.

2. Description of Related Art

Computers or servers include a chassis, a bezel, and a reinforcing plate attached to an inner side of the bezel to increase the strength of the bezel. The reinforcing plate includes a main plate, shaped similar to the bezel and at least one side flange extending from a side edge of the main plate. At least one securing member is attached to the reinforcing plate. The at least one securing member includes a clamping portion. An opening is defined in the at least one side flange. The clamping portion extends through the opening and protrudes out from the exterior surface of the at least one side flange. In assembly of the chassis, the bezel is attached to the chassis with the clamping portion engaging with a corresponding notch defined in the chassis. However, the clamping portion is difficult to disengage from the corresponding slot, thus making it difficult to detach the bezel from the chassis.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation. In the figures of the accompanying drawings, like references indicate similar elements. It should be noted that references to "an" or "one" embodiment in this disclosure are not necessarily to the same embodiment, and such references mean at least one.

Figure 1:
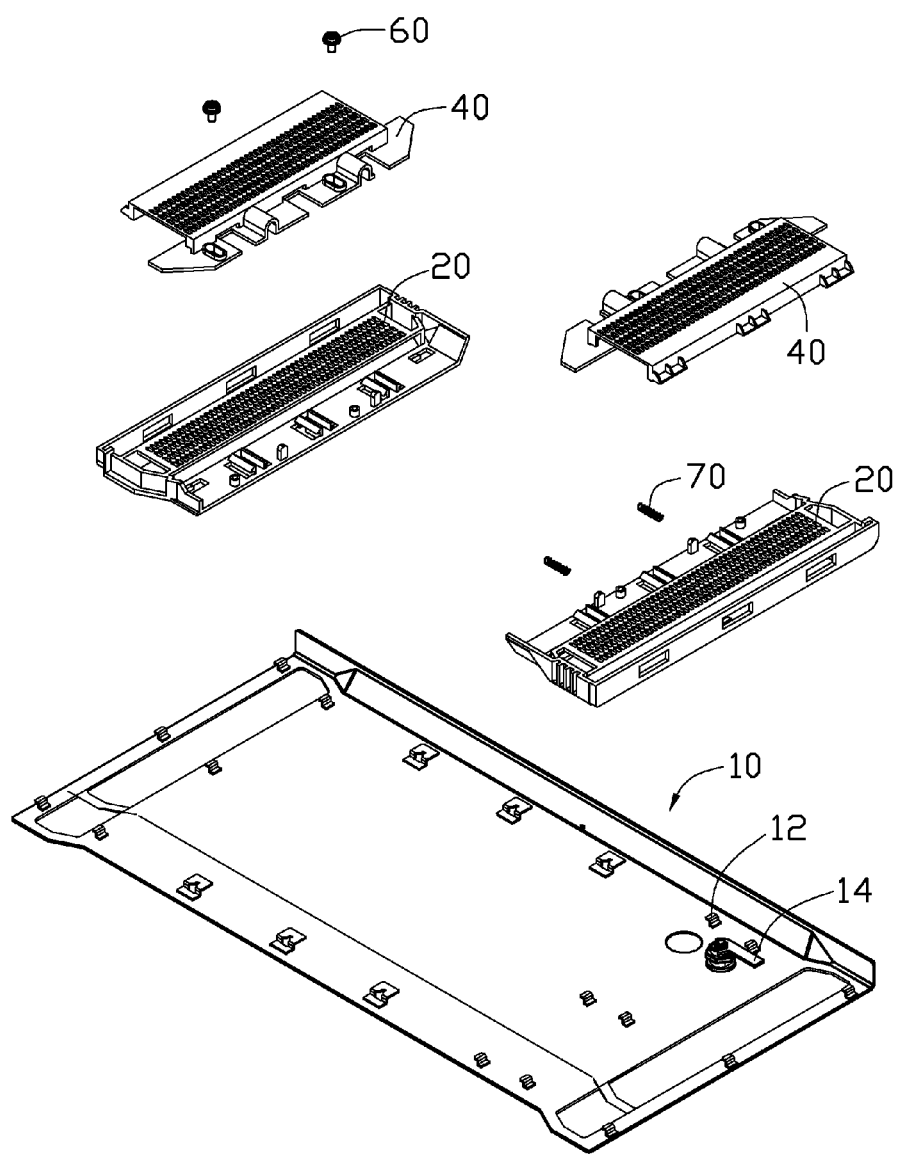
FIG. 1 is an exploded view of a bezel assembly in accordance with an embodiment of the present disclosure.

FIG. 1 is an embodiment of a bezel assembly including a bezel 10, a pair of base members 20, a pair of engaging members 40, a pair of fasteners 60, and a pair of springs 70.

A plurality of securing pieces 12 extends from an inner side of the bezel 10. Each of the plurality of securing pieces 12 has an L-shaped corner. A latch piece 14 is pivotably attached to a post (not labeled) which is secured to the inner side of the bezel 10. A key hole (not shown) is exposed at an outside of the bezel 10 for receiving a key which rotates the latch piece 14 to different positions.

Figure 2:
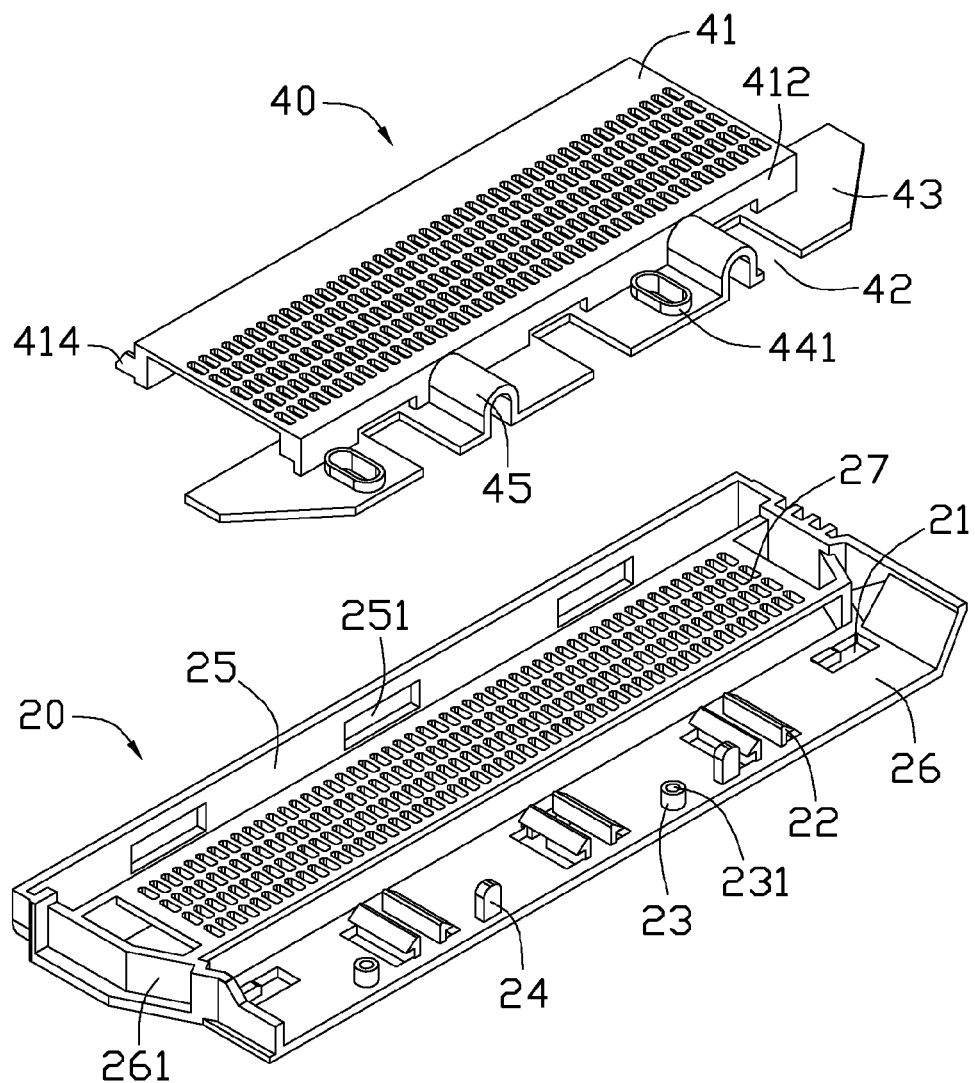
FIG. 2 is an enlarged view of a base member and an engaging member of the bezel assembly of FIG. 1.

FIG. 2 shows each of the pair of the base members 20 including a first base plate 26, a first side flange 25, a pair of second side flanges 261 extending from opposite sides of the first base plate 26, and a first ventilation plate 27. The first side flange 25 is connected to and is located between the pair of second side flanges 261. The first side flange 25 and the pair of second side flanges 261 are substantially perpendicular to the first base plate 26. The first ventilation plate 27 is located between the pair of second side flanges 261 and is substantially parallel to the first base plate 26. Two apertures 21 are defined in the first base plate 26 for engaging with the two corresponding securing pieces 12. Each of the two apertures 21 includes a wider portion and a narrow portion. At least one pair of clamping pieces 22 protrudes from the first base plate 26. A pair of mounting posts 23 extends substantially perpendicularly from an interior surface of the first base plate 26. A securing hole 231 is defined in each of the pair of mounting posts 23. A pair of blocking pieces 24 extends from the interior surface of the first base plate 26. Each of the pair of blocking pieces 24 is substantially perpendicular to the first base plate 26 and substantially parallel to the first side flange 25. A plurality of openings 251 is defined in the first side flange 25.

Figure 3:
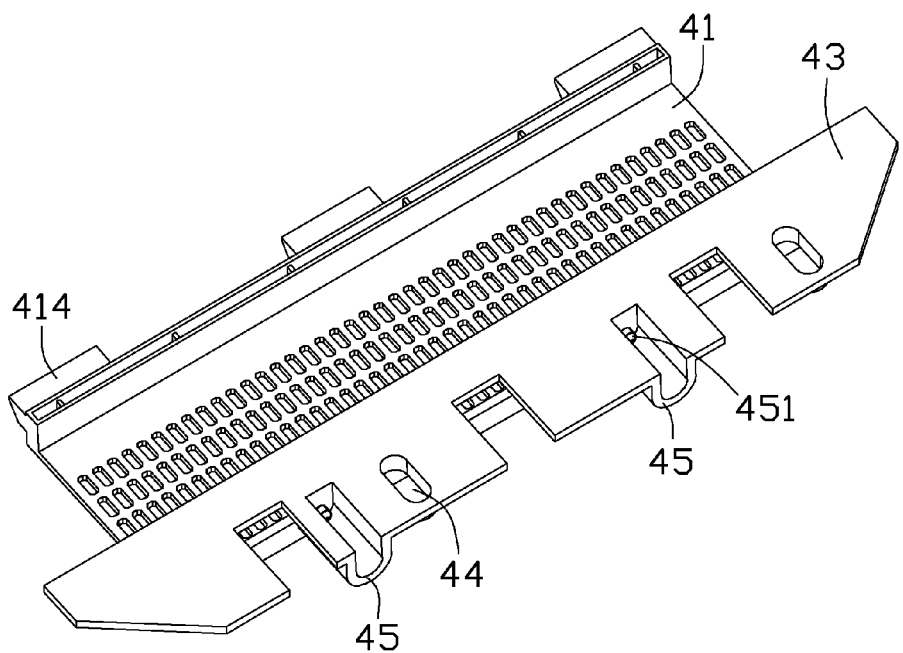
FIG. 3 is another view of the latch member of FIG. 2.

Referring to FIGS. 2 and 3, each of the engaging members 40 includes a second ventilation plate 41 and a pair of flanges 412 extending downwards from opposite sides of the second ventilation plate 41. A second base plate 43 is substantially perpendicularly attached to a base of a first of the pair of flanges 412. A plurality of engaging protrusions 414 extends from a lower portion of a second of the pair of flanges 412. At least one gap 42 is defined in the second base plate 43 corresponding to the at least one pair of clamping pieces 22. A pair of slots 44 is defined in the second base plate 43 corresponding to the pair of mounting posts 23. An enclosing protrusion 441 protrudes upwards from the periphery of each of the pair of slots 44. A pair of arch-shaped accommodating portions 45 protrudes upwards from the second base plate 43. A cylindrical post 451 extends from a base of each of the pair of arch-shaped accommodating portions 45 for mounting the spring 70. In one embodiment, a width of the second ventilation plate 41 is greater than that of the first ventilation plate 27, and a length of the second ventilation plate 41 is less than that of the first ventilation plate 27.

Figure 4:
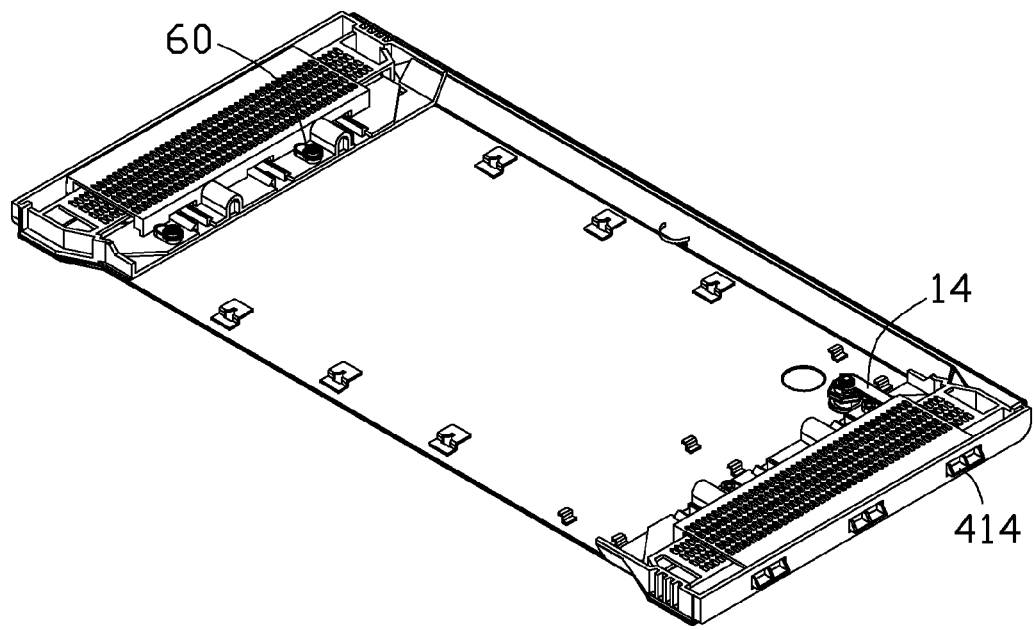
FIG. 4 is an assembled view of the bezel assembly of FIG. 1.
Figure 5:
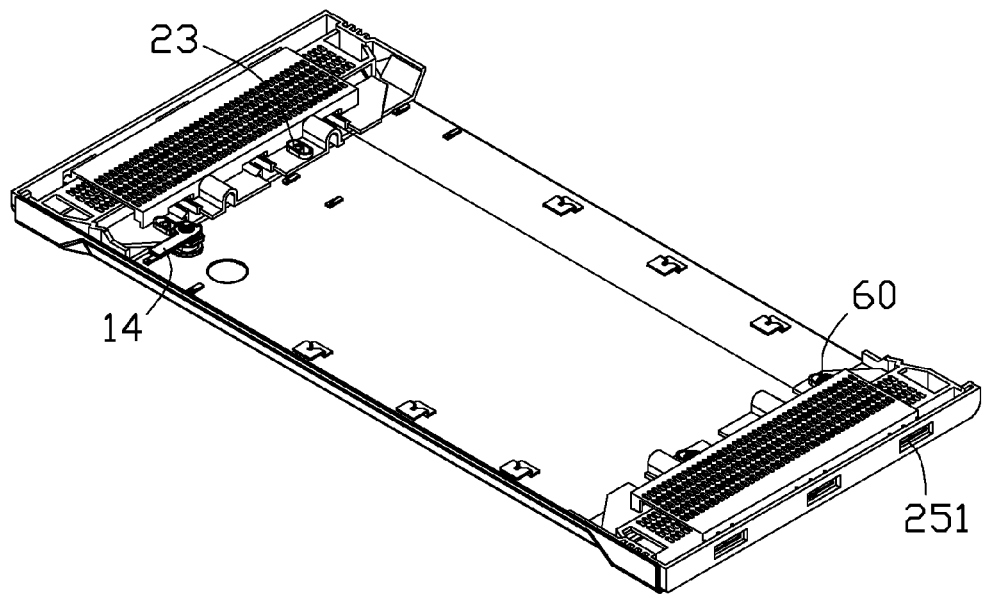
FIG. 5 is similar to FIG. 4, showing the latch member sliding to a release position.

Referring also to FIGS. 4 and 5, in assembly, each of the plurality of securing pieces 12 engages into the wider portion of a corresponding aperture 21. Each of the pair of base members 20 moves in a first horizontal direction until each of the plurality of securing pieces 12 engages into the narrower portion of the corresponding aperture 21. The pair of base members 20 is secured to the inner side of the bezel 10 and located adjacent to opposite sides of the bezel 10. The first horizontal direction is substantially parallel to the first base plate 26.

The first of the pair of engaging members 40 is attached to a first pair of base members 20. The at least one pair of clamping pieces 22 extends through the at least one gap 42 and clamps the opposite sides of the gaps 42, thereby preventing the pair of engaging members 40 from moving in a vertical direction that is substantially perpendicular to the first base plate 26. The pair of mounting posts 23 extends into the pair of slots 44. The second of the pair of flanges 412 is located between the first ventilation plate 27 and the first side flange 25. The plurality of engaging protrusions 414 extends through the plurality of openings 251 and protrudes out from an exterior surface of the first side flange 25. Each of the pair of fasteners 60 is engaged into the securing hole 231 and abuts the enclosing protrusion 441. The pair of fasteners 60 can secure the first of the pair of engaging members 40 to the first of the pair of base members 20 or only limit upward movement of the first of the pair of engaging members 40.

When the latch piece 14 is rotated from a lock position as shown in FIG. 4 to an unlock position as shown in FIG. 5, the second of the pair of engaging members 40 can be secured to the second of the pair of base members 20 by a manner similar to that disclosed above. Each pair of springs 70 is attached to the cylindrical post 451. A first distal end of each pair of springs 70 abuts the base of each pair of arch-shaped accommodating portions 45. A second distal end of each pair of springs 70 abuts a corresponding blocking piece 24.

When the pair of engaging members 40 is located at their original positions as shown in FIG. 4, the plurality of engaging protrusions 414 is engaged in the plurality of openings 251 and protrudes out from the first side flange 25. The latch piece 14 is rotated to the lock position resisting the second of the pair of engaging members 40, thereby preventing the second of the pair of engaging members 40 moving from the original position to a release position wherein the plurality of engaging protrusions 414 is disengaged from the plurality of openings 251. To lock the bezel 10 to a computer chassis (not shown), the plurality of engaging protrusions 414 which protrudes out from the first side flange 25 can be engaged into corresponding notches defined in the computer chassis.

To detach the bezel 10 from the computer chassis, the latch piece 14 is rotated from the locked position to the unlocked position as shown in FIG. 5, and the pair of engaging members 40 moves in opposite horizontal directions towards a central portion of the bezel 10. The pair of mounting posts 23 moves in the pair of slots 44. The pair of springs 70 is compressed and stores potential energy for urging the second of the pair of engaging members 40 back to its original position. The plurality of engaging protrusions 414 is disengaged from the plurality of openings 251 and retracts to an inner side of the first side flange 25. The plurality of engaging protrusions 414 can then be disengaged from the corresponding notches of the computer chassis, thereby releasing the bezel 10 from the computer chassis.

While the present disclosure has been illustrated by the description in this embodiment, and while the embodiment has been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A bezel assembly comprising:
   a bezel;
   a latch piece pivotably attached to an inner side of the bezel;
   at least one base member, secured to an inner side of the bezel, comprising a first side flange substantially perpendicular to the bezel, at least one mounting post, and at least one opening being defined in the first side flange; and
   at least one engaging member, slidably attached to the at least one base member, comprising at least one engaging protrusion, at least one slot being defined in the at least one engaging member, and the at least one mounting post slidably engaged with the at least one slot;
   wherein the at least one engaging member is slidable between an original position, wherein the at least one engaging protrusion engages into the at least one opening and protrudes out from an exterior surface of the first side flange, and a release position, wherein the at least one engaging protrusion is disengaged from the at least one opening and retracts to an inner side of the first side flange; the latch piece is rotatable between an unlock position, wherein the latch piece is disengaged from the at least one engaging member, the at least one engaging member is in the release position and is nearest to the latch piece, and a locked position, wherein the latch piece abuts the at least one engaging member, the at least one engaging member is pushed by the latch piece to the original position and is farthest from the latch piece; and the latch piece is rotated in the same plane as the at least one engaging member slides.

2. The bezel assembly of claim 1, wherein the at least one base member further comprises a first base plate abutting the bezel, a pair of second side flanges extending from opposite sides of the first base plate, and a first ventilation plate located between the pair of second side flanges.

3. The bezel assembly of claim 2, wherein the at least one engaging member comprises a second ventilation plate, a pair of flanges extending substantially perpendicularly from opposite sides of the second ventilation plate, and a second base plate attached to a base of a first one of the pair of flanges.

4. The bezel assembly of claim 3, wherein a width of the second ventilation plate is greater than that of the first ventilation plate, and a length of the second ventilation plate is less than that of the first ventilation plate.

5. The bezel assembly of claim 3, wherein the at least one slot is defined in the second base plate, the at least one mounting post protrudes from the first base plate, and the at least one engaging member further comprises an enclosing protrusion protruding from the periphery of the at least one slot.

6. The bezel assembly of claim 5, further comprising at least one fastener, wherein the at least one mounting post defines a securing hole therein, and the at least one fastener is engaged with the securing hole and abuts the enclosing protrusion.

7. The bezel assembly of claim 3, wherein the second base plate defines at least one gap therein, the at least one base member further comprises at least one pair of clamping pieces protruding from the first base plate and engaging with the at least one gap for preventing the at least one engaging member from moving in a vertical direction that is perpendicular to the first base plate.

8. The bezel assembly of claim 3, further comprising at least one spring, wherein the at least one engaging member further comprises at least one arch-shaped accommodating portion protruding from the second base plate for mounting the at least one spring.

9. The bezel assembly of claim 8, wherein the at least one base member further comprises at least one blocking piece protruding from the first base plate, the at least one engaging member further comprises a cylindrical post protruding from a base of the arch-shaped accommodating portion and extending in the at least one spring, a first distal end of the at least one spring abuts the base of the arch-shaped accommodating portion, and a second distal end of the at least one spring abuts the at least one blocking piece.

10. The bezel assembly of claim 1, further comprising a latch piece pivotably attached to the bezel and rotatable between an unlock position, wherein the latch piece is disengaged from the at least one engaging member for allowing the at least one engaging member moving between the original position and the release position, and a locked position, wherein the latch piece abuts the at least one engaging member for preventing the at least one engaging member moving from the original position to the release position.

11. A bezel assembly comprising:
    a bezel;
    a latch piece pivotably attached to an inner side of the bezel;

at least one base member, secured to the inner side of the bezel, comprising a first side flange substantially perpendicular to the bezel, and at least one opening being defined in the first side flange; and at least one engaging member, slidably attached to the at least one base member, comprising at least one engaging protrusion;

wherein the engaging member is slidable between an original position, wherein the at least one engaging protrusion engages into the at least one opening and protrudes out from an exterior surface of the first side flange, and a release position, wherein the at least one engaging protrusion is disengaged from the at least one opening and retracts to an inner side of the first side flange; and the latch piece is rotatable between an unlock position, wherein the latch piece is disengaged from the at least one engaging member for allowing the at least one engaging member moving between the original position and the release position, and a locked position, wherein the latch piece abuts the at least one engaging member for preventing the at least one engaging member moving from the original position to the release position; and the latch piece is rotated in the same plane as the at least one engaging member slides.

12. The bezel assembly of claim 11, wherein the at least one base member further comprises a first base plate abutting the bezel, a pair of second side flanges extending from opposite sides of the first base plate, and a first ventilation plate located between the pair of second side flanges.

13. The bezel assembly of claim 12, wherein the at least one engaging member comprises a second ventilation plate, a pair of flanges extending substantially perpendicularly from opposite sides of the second ventilation plate, and a second base plate attached to a base of a first one of the pair of flanges.

14. The bezel assembly of claim 13, wherein a width of the second ventilation plate is greater than that of the first ventilation plate, and a length of the second ventilation plate is less than that of the first ventilation plate.

15. The bezel assembly of claim 13, wherein at least one slot is defined in the second base plate, and at least one mounting post protrudes from the first base plate and slidably engages with the at least one slot.

16. The bezel assembly of claim 15, further comprising at least one fastener, wherein the at least one mounting post defines a securing hole therein for engaging with the at least one fastener.

17. The bezel assembly of claim 13, wherein the second base plate defines at least one gap therein, and the at least one base member further comprises at least one pair of clamping pieces protruding from the first base plate and engaging with the at least one gap for preventing the at least one engaging member moving in a vertical direction that is perpendicular to the first base plate.

18. The bezel assembly of claim 13, further comprising at least one spring, wherein the at least one engaging member further comprises at least one arch-shaped accommodating portion protruding from the second base plate for mounting the at least one spring.

19. The bezel assembly of claim 18, wherein the at least one base member further comprises at least one blocking piece protruding from the first base plate, the at least one engaging member further comprises a cylindrical post protruding from a base of the arch-shaped accommodating portion and extending in the at least one spring, a first distal end of the at least one spring abuts the base of the arch-shaped accommodating portion, and a second distal end of the at least one spring abuts the at least one blocking piece.

20. The bezel assembly of claim 19, wherein the at least one blocking piece is substantially perpendicular to the first base plate and is substantially parallel to the first side flange.

\* \* \* \* \*